(12) United States Patent
Westerbeke

(10) Patent No.: US 7,314,044 B2
(45) Date of Patent: Jan. 1, 2008

(54) MARINE EMISSIONS CONTROL

(75) Inventor: John H. Westerbeke, Milton, MA (US)

(73) Assignee: WBIP, LLC, Taunton, MA (US)

( * ) Notice: Subject to any disclaimer, the term of this patent is extended or adjusted under 35 U.S.C. 154(b) by 0 days.

(21) Appl. No.: 11/624,536

(22) Filed: Jan. 18, 2007

(65) Prior Publication Data
US 2007/0113543 A1 May 24, 2007

Related U.S. Application Data

(63) Continuation of application No. 10/974,380, filed on Oct. 27, 2004.

(60) Provisional application No. 60/515,166, filed on Oct. 27, 2003.

(51) Int. Cl.
F02D 41/00 (2006.01)
F02D 41/02 (2006.01)

(52) U.S. Cl. ............... 123/672; 60/274; 60/298; 440/89 B; 440/89 H

(58) Field of Classification Search ........ 123/672; 60/274, 298, 299, 320, 324; 440/89, 89 B, 440/89 C; 44/89 H
See application file for complete search history.

(56) References Cited

U.S. PATENT DOCUMENTS

| | | |
|---|---|---|
| 3,791,146 A | 2/1974 | Hayashi |
| 4,707,984 A | 11/1987 | Katsuno et al. |
| 4,884,066 A | 11/1989 | Miyata et al. |
| 5,125,231 A | 6/1992 | Patil et al. |
| 5,203,167 A * | 4/1993 | Lassanske et al. ......... 60/298 |
| 5,359,853 A | 11/1994 | Shimizu |
| 5,408,827 A * | 4/1995 | Holtermann et al. ......... 60/298 |
| 5,536,477 A | 7/1996 | Cha et al. |
| 5,609,023 A | 3/1997 | Katoh et al. |
| 5,619,852 A | 4/1997 | Uchikawa |
| 5,715,794 A | 2/1998 | Nakamura et al. |
| 5,787,847 A * | 8/1998 | Ozawa et al. ......... 123/73 AD |
| 5,788,547 A * | 8/1998 | Ozawa et al. ............ 440/89 R |
| 5,797,775 A * | 8/1998 | Ozawa et al. ................ 440/1 |
| 5,809,773 A | 9/1998 | Gottberg |
| 5,813,222 A | 9/1998 | Appleby |
| 5,902,158 A | 5/1999 | Nakase et al. |
| 5,911,609 A | 6/1999 | Fujimoto et al. |
| 5,911,610 A * | 6/1999 | Fujimoto .............. 440/89 R |
| 5,921,076 A | 7/1999 | Krutzsch et al. |
| 5,937,637 A | 8/1999 | Fujishita et al. |
| 6,044,643 A | 4/2000 | Ittner et al. |
| 6,047,542 A | 4/2000 | Kinugasa et al. |
| 6,053,785 A * | 4/2000 | Kato et al. ............. 440/89 R |
| 6,120,335 A * | 9/2000 | Nakase et al. .......... 440/89 B |
| 6,122,909 A | 9/2000 | Murphy et al. |

(Continued)

FOREIGN PATENT DOCUMENTS

WO WO 97/47863 12/1997

Primary Examiner—Mahmoud Gimie
(74) Attorney, Agent, or Firm—Fish & Richardson P.C.

(57) ABSTRACT

A marine engine has an exhaust system including a catalyst cooled by a flow of coolant, a coolant injector that injects coolant into the flow of exhaust at a point downstream of the catalyst, and a sensor arranged to sense a characteristic of the flow of exhaust, such as oxygen or carbon monoxide level. The engine controller is configured to control an air/fuel ratio of the engine as a function of the sensed exhaust flow characteristic.

19 Claims, 5 Drawing Sheets

U.S. PATENT DOCUMENTS

| | | |
|---|---|---|
| 6,122,910 A | 9/2000 | Hoshi et al. |
| 6,309,268 B1 | 10/2001 | Mabru |
| 6,321,530 B1 | 11/2001 | Hoshi et al. |
| 6,432,368 B1 | 8/2002 | Feitelberg et al. |
| 6,435,925 B1 | 8/2002 | Mabru |
| 6,446,431 B1 | 9/2002 | Brück |
| 6,461,208 B2 * | 10/2002 | Suzuki et al. ............ 440/89 R |
| 6,511,355 B1 | 1/2003 | Woodward |
| 6,579,137 B2 | 6/2003 | Mabru |
| 6,655,341 B2 | 12/2003 | Westerbeke, Jr. |
| 6,799,422 B2 * | 10/2004 | Westerbeke et al. .......... 60/289 |

* cited by examiner

MARINE EMISSIONS CONTROL

CLAIM OF PRIORITY

This application is a continuation of U.S. Ser. No. 10/974,380, filed Oct. 27, 2004, and claims priority under 35 U.S.C. § 119(e) to U.S. Provisional Patent Application Ser. No. 60/515,166, filed on Oct. 27, 2003, the entire contents of which are hereby incorporated by reference.

TECHNICAL FIELD

This invent relates to controlling emissions from marine engines.

BACKGROUND

Reducing combustion engine exhaust emissions is a continued object of research and development, driven both by awareness of environmental effects and increased government regulation. Some of the most effective and cost-efficient emissions controls involve the use of downstream chemical catalysts that further oxygenate incompletely combusted compounds. Sometimes exhaust is directed sequentially through multiple catalyst beds. It is generally understood that higher catalyst temperatures provide more effective emissions control. Much exhaust catalysis development has been focused on developing catalytic converters for automotive applications, in which engine speed varies substantially with vehicle speed and gear selection.

Marine engines and generators are subjected to specific regulations, both for emissions and for safety concerns. For example, exposed engine surface temperatures (including exhaust system surface temperatures) must be kept low to avoid increased risk of fire hazard. Seawater is injected into many marine engine exhaust flows so as to cool exiting exhaust gases, and seawater is also frequently circulated through exhaust system components so as to maintain low surface temperatures.

Further improvements in exhaust emissions controls for constant and variable speed engine applications are desired, particularly improvements suitable for marine use.

SUMMARY

According to one aspect of the invention, a marine engine includes an exhaust system having a catalyst cooled by a flow of coolant and arranged to intercept a flow of exhaust, a coolant injector that injects coolant into the flow of exhaust at a point downstream of the catalyst, and a sensor arranged to sense a characteristic of the flow of exhaust (such as oxygen level). The engine also includes an engine controller configured to control an air/fuel ratio of the engine as a function of the sensed exhaust flow characteristic.

In some instances, the engine controller is also configured to govern engine speed with respect to a constant speed while maintaining the air/fuel ratio.

In some embodiments the sensor is disposed downstream of the coolant injector.

As mentioned, the sensor may be an oxygen sensor, such as a narrow-band oxygen sensor.

Some embodiments include a second sensor, such as a carbon monoxide sensor.

For some applications the engine controller maintains the air/fuel ratio at a stoichiometric level, or lightly leaner than stoichiometric.

In some cases the engine controller controls the air/fuel ratio by controlling an electronic fuel injection system.

Preferably, the catalyst is configured to simultaneously reduce oxides of nitrogen, carbon monoxide and hydrocarbons. In some instances the catalyst is configured to reduce carbon monoxide to between about 9 parts per million and 30 parts per million.

In some applications, the exhaust system further comprises a water-jacketed exhaust manifold.

Some such engines are coupled to drive an electronic generator.

Another aspect of the invention features a method of controlling emissions from an internal combustion engine configured for marine application. The method includes flowing a flow of coolant through an exhaust system of the engine to cool a catalyst positioned to intercept a flow of exhaust flowing along the exhaust system, injecting coolant into the flow of exhaust at a point downstream of the catalyst, sensing a characteristic of the flow of exhaust (such as oxygen level), and controlling an air/fuel ratio of the engine as a function of the sensed exhaust flow characteristic. In some embodiments the method also includes monitoring a second exhaust flow characteristic, such as carbon monoxide level, downstream of the catalyst and providing a warning to an operator when the second exhaust flow characteristic reaches a threshold level. In some instances the method includes controlling the air/fuel ratio with electronic fuel injection. Some examples also include flowing coolant through a jacket about an exhaust manifold of the engine.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
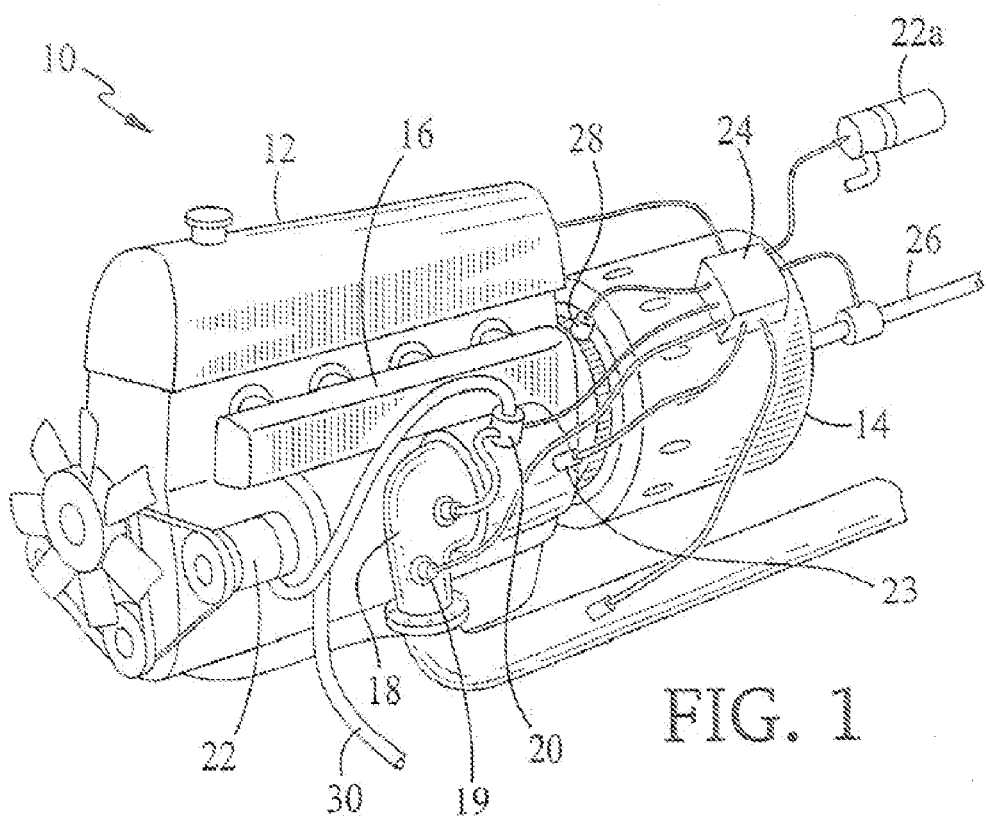
FIG. 1 is a perspective view of a marine engine-generator set.

Referring first to FIG. 1, an engine-generator set 10 includes an internal combustion engine 12 driving an electrical generator 14. Engine 10 has an exhaust manifold 16 that receives and combines exhaust gasses from each cylinder of the engine and directs the combined exhaust gasses through a catalyst contained within the manifold, as is discussed in more detail below. Secured to the outlet of the manifold 16 is an exhaust elbow 18. In a marine application, water, such as cold seawater, is supplied to manifold 16} through hose 30. The water is directed through cooling passages in manifold 16 and elbow 18 to keep the outer surfaces of the exhaust system at or below a desired temperature, and is then injected into the exhaust stream in elbow 18, downstream of the catalysts, to cool the exhaust.

In one embodiment, a variable is monitored with a feedback sensor 19 located upstream of the catalyst which provides a control signal to electronic controller 24. In one embodiment, controller 24 provides controls the air fuel ratio of the engine 12 to correspond to a 1.0 stoichiometric ratio. In other embodiments, the air fuel ratio of the engine 12 is slightly lean. In one embodiment, the variable monitored by the feedback sensor is 19 is oxygen and the feedback sensor 19 is a narrow-band oxygen sensor.

In one embodiment, an exhaust sensor 23 is mounted downstream of the catalyst. In one embodiment, the exhaust sensor 23 measures oxygen as a proxy for indirectly determining the level of carbon monoxide. In this application, a wide-band oxygen sensor can be used. In other applications, the exhaust sensor 23 directly measures carbon monoxide. The signal output from the exhaust sensor 23 can provide an anticipatory alarm apprising an operator when the catalyst 32 is functioning with reduced effectiveness. Accordingly, the exhaust sensor can inform the operator if the catalyst 32 has been damaged by seawater and requires replacement. The exhaust sensor 23 can be a MEMS device in some embodiments.

With continued reference to FIG. 1 and in an alternative embodiment, air is delivered to manifold 16, through a controllable dump valve 20, from belt-driven air pump 22. A fixed speed, electric air pump may also be employed. Valve 20 is controlled by an electronic controller 24 to moderate the flow of air into manifold 16 as a function of the load placed on engine 12, such as by controllably dividing the output of the air pump between manifold 16 and exhaust elbow 18. Controller 24 varies a signal to valve 20 as a function of engine load, or as a function of a sensible parameter that changes with engine load. In the illustrated embodiment, controller 24 senses an output voltage and/or current of generator 14, such as at generator output 26, and controls valve 20 accordingly. Controller 24 also senses engine speed, such as by receiving a signal from flywheel magnetic reluctance sensor 28, and controls engine inputs (such as fuel and/or air flow) to maintain engine speed at or near a desired set point, so as to maintain the frequency of generator 14. As an alternative to controlling a dump valve 20 splitting pump air flow between manifold 16 and either atmosphere or a lower point in the exhaust stream, a variable speed electric air pump 22a is employed in some instances, with controller 24 varying the operating speed of pump 22a as a function of engine load. In such cases, the entire output of pump 22a is perfectly ported directly to manifold 16.

Figure 2:
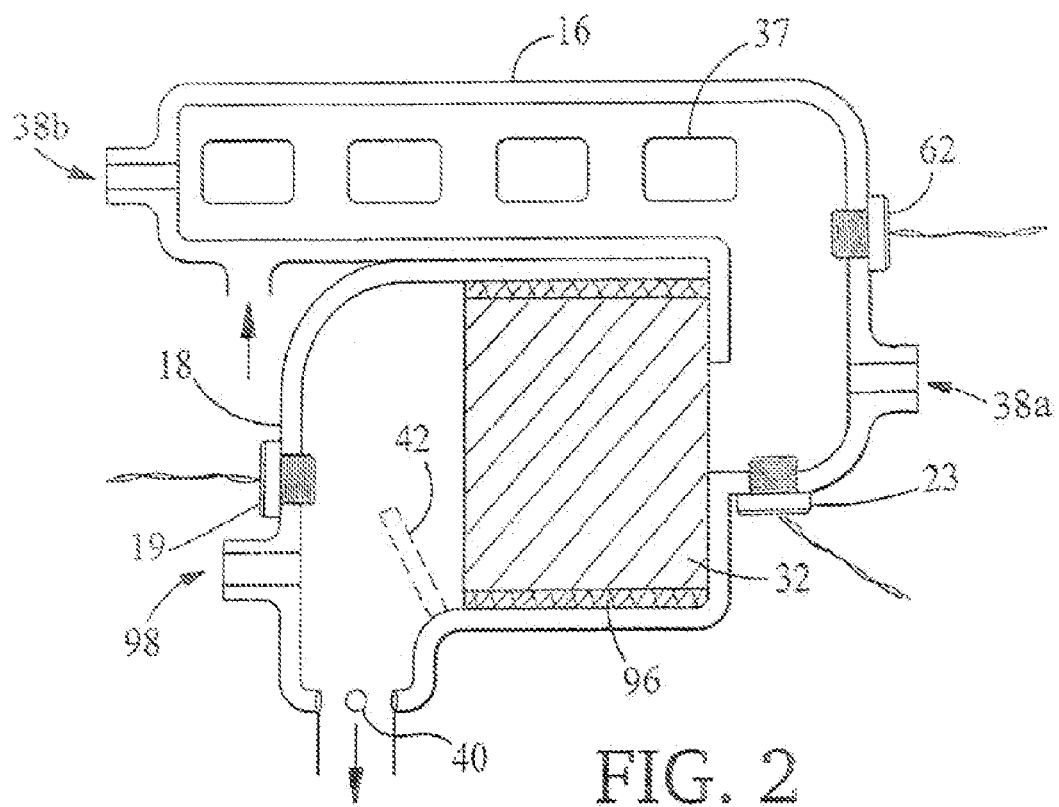
FIG. 2 is a schematic cross-section illustrating flow through the exhaust manifold and elbow of the engine-generator set of FIG. 1.

Referring to now FIG. 2, a cylindrical catalyst 32 containing a catalyst bed is shown disposed within the exhaust manifold 16. The catalyst 32 is wrapped in an insulating blanket 96, such as a ⅛ inch (3.2 millimeter) thick sheet of cotton binding containing mica, for example, that helps reduce heat transfer from the catalyst into the housing and also helps to isolate the delicate catalyst bed from shocks and vibrations. In one embodiment, controlled air flow is injected either just forward of the catalyst at port 38a, or at the far end of the manifold at port 38b so as to preheat the injected air flow. Single catalyst 32 may be of any preferred composition, such as a palladium-platinum catalyst, for example. In other embodiments, no air flow injection is required.

With continued reference to FIG. 2 and in one embodiment, catalyst 32 is configured and dimensioned for fitting within a marine exhaust manifold 16. In one presently preferred embodiment, the catalyst 32 has a diameter of 3.66 inch (9.30 cm) and a length of 6.0 inch (15.24 cm). The catalyst 32 can include a round ceramic having a diameter of 3.0 inch (7.62 cm) and a length of 6.0 inch (15.24 cm) and a 400-cells per inch with 95-grams per cubic foot of a 3-to-1 ratio of platinum to rhodium. The catalyst 32 can also include a specialized wash coat designed to be the most effective at a 1.0 stoichiometric air fuel ratio. The catalyst 32 is configured to simultaneously reduce oxides of nitrogen, carbon monoxide and hydrocarbons. In one preferred embodiment, the catalyst 32 is configured to reduce carbon monoxides levels to below 50 part per million, preferably to below 35 parts per million, and most preferably to below ambient levels, i.e., 9 part per million.

Figure 3:
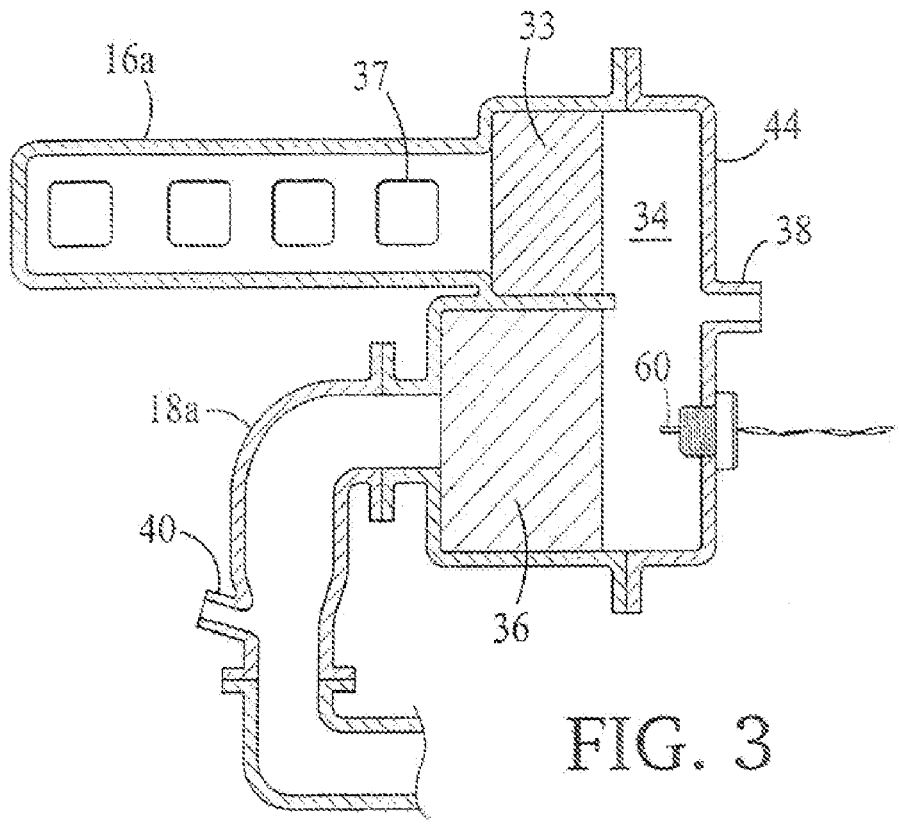
FIG. 3 illustrates an alternative second exhaust manifold construction and catalyst arrangement.

Other catalyst configurations are contemplated within the exhaust manifold 16. For example as illustrated in FIG. 3, the catalyst 32 in an alternative embodiment can include a first catalyst 33 an second catalyst 36 contained within a second bore of the manifold, parallel to and offset from the first bore. The manifold can be equipped with a removable cover 44 through which the air is injected, enabling loading of both of the catalysts into their respective bores. As in the first illustrated embodiment, after flowing through both catalyst beds the exhaust flow is combined with cooling water in elbow 18a.

The exhaust is combined and directed through a first catalyst bed 33, through a space 34, and then through a second catalyst bed 36. The air is injected into the manifold in space 34, through air inlet 38. Cooling water flows around both catalyst beds, through appropriate channels cast into manifold 16a and elbow 18, and is then injected into the exhaust flow. In marine applications where the cooling seawater can have a high salt content, the water injection outlets 40 in elbow 18 are preferably at least about six inches (15 centimeters) below the lowest edge of the catalysts or the upper edge of any internal elbow baffles 42 positioned to avoid salt water splash on the hot catalysts. Also, it is preferred that for such marine applications manifold 16a and elbow 18 be cast of a corrosion-resistant material, such as an aluminum-magnesium alloy. It will be apparent from FIG. 2 that the connection between manifold 16a and elbow 18 can be readily positioned between the two catalyst beds, such that second catalyst 36 is carried within elbow 18.

The construction of the catalyst 32 according to this embodiment can include a first catalyst bed 33 which preferably includes a catalyst such as one containing rhodium as the precious metal, selected to reduce hydrocarbon and $NO_x$ emissions. For example, one preferred catalyst bed is in the form of a cylinder 3.0 inches (76 millimeters) in diameter and 2.6 inches (6.7 centimeters) long. The ceramic substrate has a cross-sectional area of about 7 square inches (45 square centimeters) and has about 400 cells per square inch (62 per square centimeter), and is washed with 6.1 grams per cubic foot (0.06 grams per cubic centimeter) of rhodium. Such a catalyst bed is available from ASEC/Delphi Exhaust and Engine Management of Flint, Mich. Catalysis efficiency within first catalysis bed 33 may be accomplished by various methods known in the art, either in carbureted or fuel-injection systems with oxygen sensors, to remove as much of the overall emissions components as possible.

The second catalyst bed 36 contains a catalyst selected to further reduce CO emissions. In one arrangement, second catalyst bed 36 contains a three to one ratio of palladium and platinum, carried on a honey-combed substrate of ceramic or metal. The active precious metals are washed onto the substrate and then heated to set the metals onto the surface as known in the art. An example of a preferred second catalyst bed is a metal substrate in the form of a cylinder of 5.0 inch (12.7 centimeter) diameter and 6.3 inch (16 centimeter) length, with 19.6 square inches (126 square centimeters) of cross-sectional area, washed with 40 grams per cubic foot (0.4 grams per cubic centimeter) each of palladium and platinum. Such a catalyst is available from Miratech of Tulsa, Okla., for example. Second catalyst 36 will tend to run hotter, such as perhaps about 400 degrees Fahrenheit (220 degrees Celsius) hotter than the rhodium catalyst. Preferably, the temperature of the combined air and exhaust entering the second catalyst is about 1000 degrees Fahrenheit (540 degrees Celsius).

Figure 4:
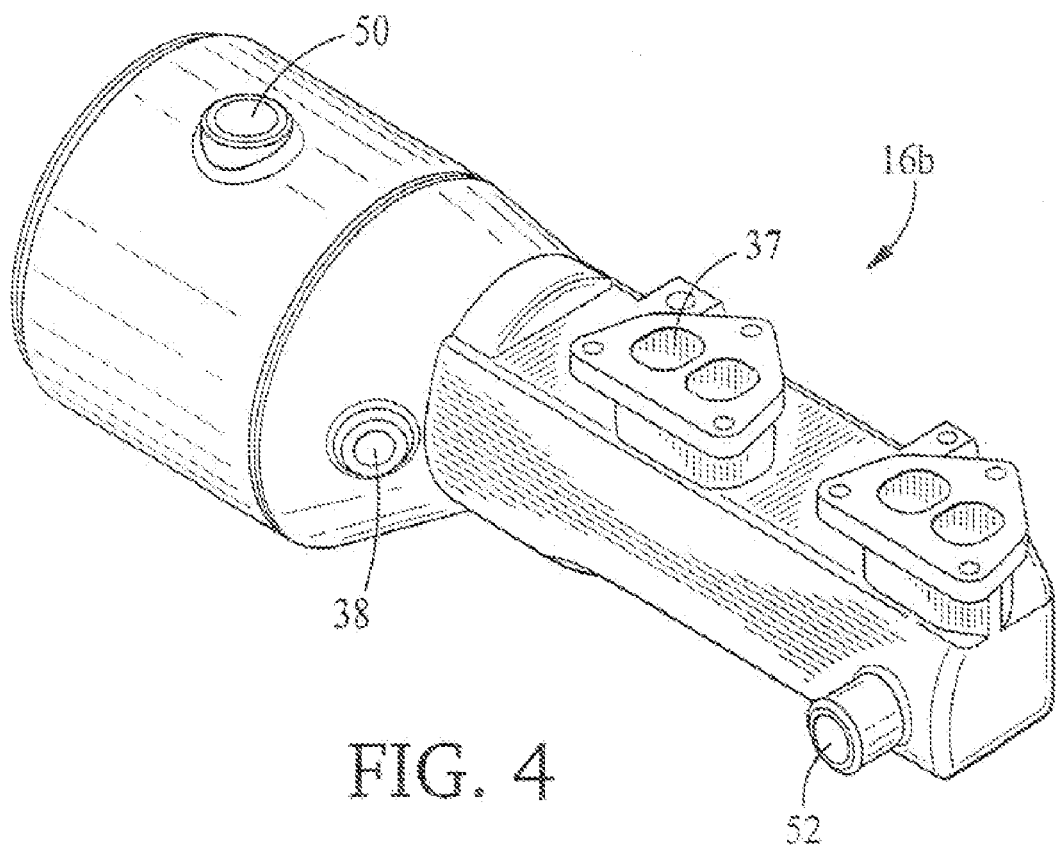
FIG. 4 is a perspective view of an engine exhaust manifold.
Figure 5:
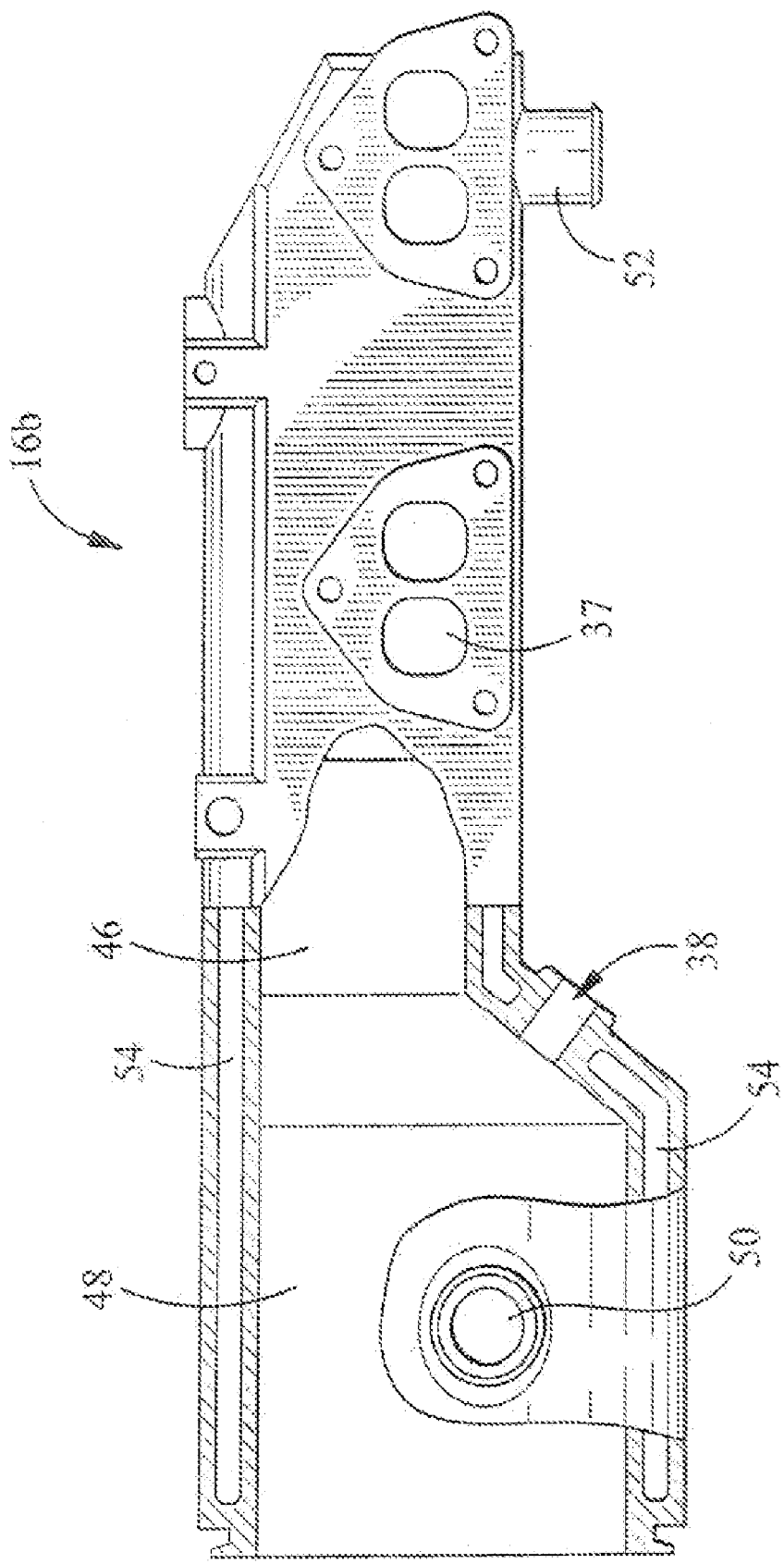
FIG. 5 is a partial cross-sectional view of the manifold of FIG. 4.

FIGS. 4 and 5 show another example of a catalyst exhaust manifold 16*b*. The catalyst 32 is loaded as a cylinder from the large end of the manifold, with the $NO_x$ catalyst loaded into bore 46 (FIG. 5) and the CO catalyst loaded into bore 48 (FIG. 5). In this example, coolant enters the manifold at inlet 50 and leaves the manifold at outlet 52, without joining the exhaust stream. The cooling channels 54 cast into the manifold are partially shown in FIG. 5, providing a closed flow path between inlet 50 and outlet 52.

Various control techniques may be employed to vary air injection rate for good CO reduction. In one embodiment, the air injection rate is varied as a function of approximate engine load. In one test using a Westerbeke 4-cylinder, 1.5 liter gasoline engine and the palladium-platinum second catalyst bed described above, the lowest CO emissions were provided by varying the rate of air flow into the manifold ahead of the second catalyst (at 100 liter per minute graduations) according to the following table:

| Engine Load (Percent Full Load) | Air Flow Rate (liters per minute) |
|---|---|
| 100 | 500 |
| 75 | 500 |
| 50 | 500 |
| 25 | 400 |
| 10 | 300 |
| 0 | 300 |

Of course, optimal air flow rates will be different for different applications. The air flow controller can be configured to interpolate between adjacent entries in the load-air correlation table to provide finer control sensitivity.

There are various ways to determine approximate engine load, such that a table like that shown above can be used to determine an optimal air injection rate. For example, if substantially all of the engine load is provided by an electrical generator (as shown in FIG. 1), monitoring the electrical output of the generator can provide a good estimate of engine load. Current can be monitored as a most direct measure of electrical load, such as providing a current transformer about the output of the generator. In some cases in which generator voltage is known to predictably decrease a measurable amount with load, voltage may alternately be monitored. In most cases, however, current monitoring is preferred for systems with proper generator voltage regulation. Other options include measuring engine output driveshaft torque (or some measurable parameter that varies predictably with torque), or measuring the pressure within the manifold, such as upstream of the catalyst beds, or exhaust backpressure below the catalysts and above a muffler or other exhaust restriction. Because the engine speed is substantially fixed in the primary embodiments, other parameters may also be found to vary predictably with engine load, such as throttle position and fuel flow rate, for example.

As an alternative to controlling the air injection rate as a function of load, the air injection rate can be controlled as a function of other measured parameters that signify catalysis efficiency. For example, a CO sensor may be provided downstream of the catalyst as described above.

With renewed reference to FIG. 2 an in one embodiment, an exhaust pressure sensor 62 can be placed in the manifold 16, to measure exhaust manifold pressure, or downstream of the catalyst 32 to measure exhaust backpressure developed upstream of a muffler or other exhaust restriction (not shown). If the air pump delivering air to inlet 38 is not a fixed displacement pump, changes in exhaust backpressure with engine load can cause a significant fluctuation in the injected air rate. This fluctuation will tend to work against the desired variation of air flow rate with engine load, as backpressure, which rises with engine load, will cause a reduction in air injection rate that should be accounted for in the control of the pump or valve. It will be understood that sensors 62 are shown in optional and alternative locations, and are not necessary in some embodiments, such as when air flow rate is controlled as a function of generator current or some other primary control parameter.

Figure 6:
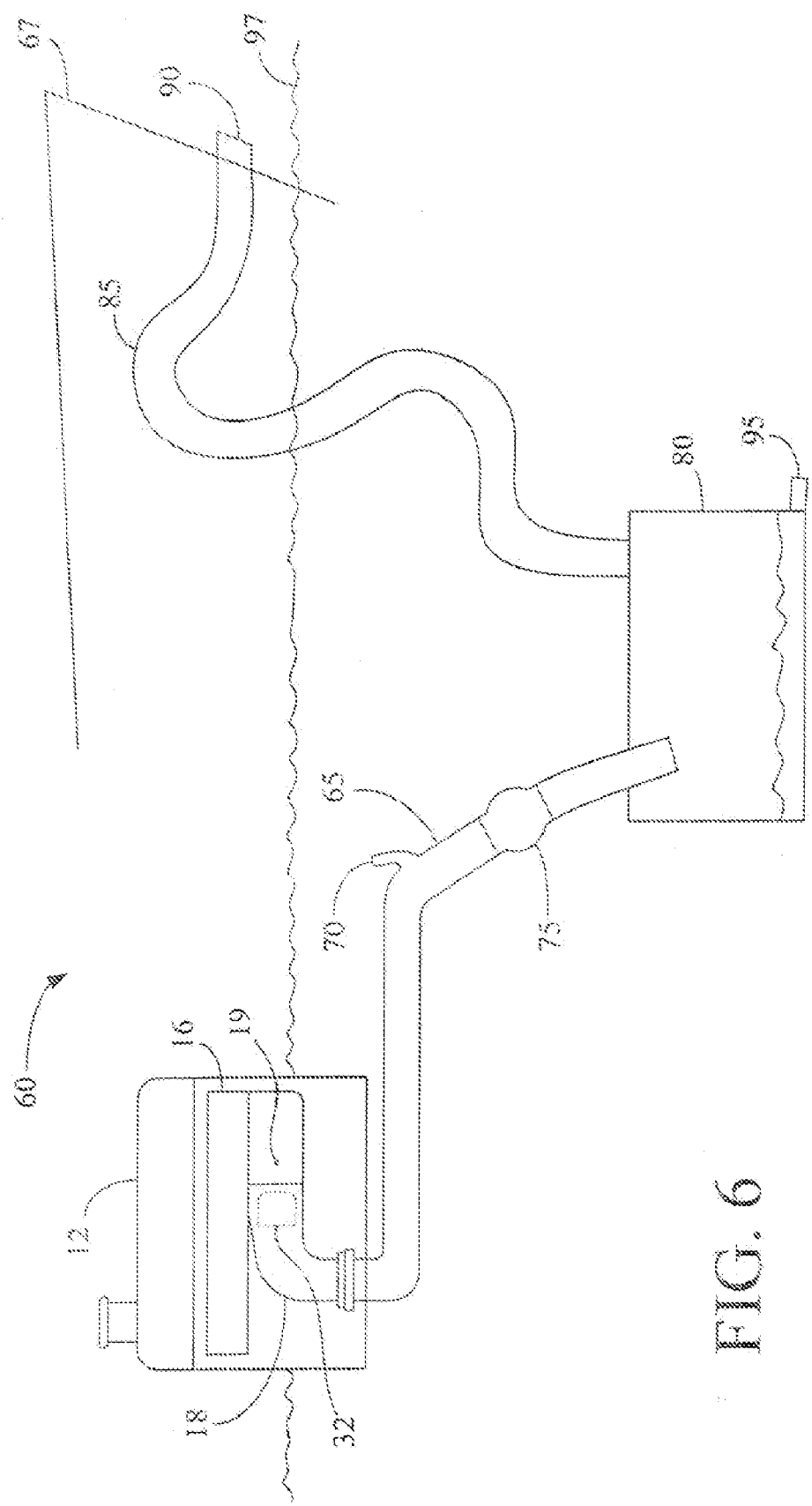
FIG. 6 shows a schematic view of a marine exhaust system according to the invention.

Referring now to FIG. 6, an exhaust system 60 for the engine 12 mounted in a boat 67 is shown. The exhaust manifold 16 directs exhaust gases through the catalyst 32 and exhaust elbow 18 and past a water injected exhaust elbow 65. To reduce the operating temperature of the exhaust components, cooling seawater is injected at the inlet to the exhaust elbow 70. The exhaust gases and cooling water then pass through an exhaust valve and water level indicator 75 (discussed in more detail below). The exhaust gasses and cooling water enter a water lift marine muffler 80 before proceeding to a high point at the U-bend 85 and out of the boat through the through-hull fitting 90 above the water line 97. In one embodiment, the muffler 80 includes a drain 95.

Figure 7:
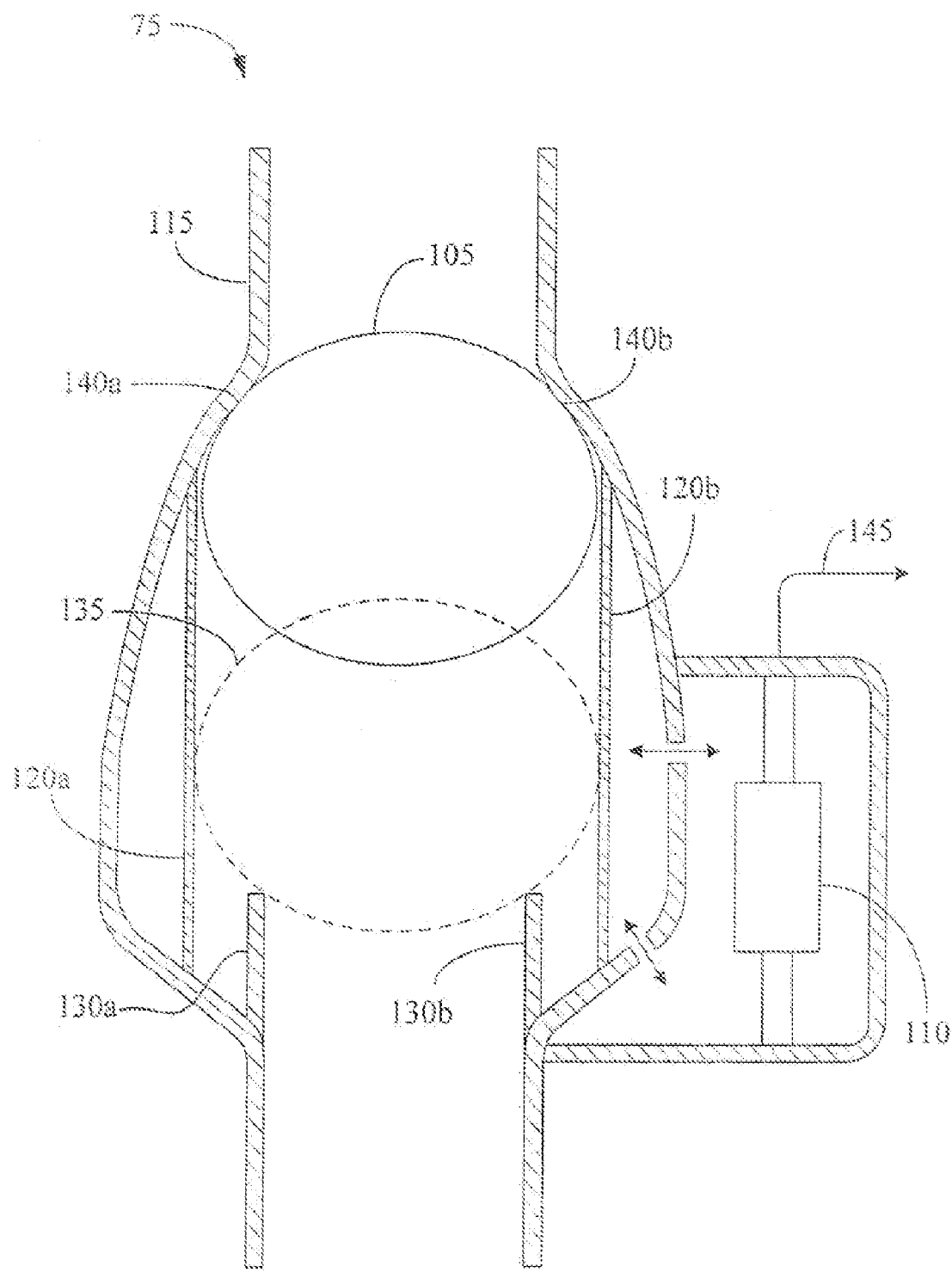
FIG. 7 is a detail view of a float valve and water level indicator contained within the marine exhaust system.

In marine applications, it is desirable to prevent cooling seawater from contacting the catalyst 32 disposed within the exhaust manifold 16. It is also desirable to prevent cooling seawater from reaching the engine 12, which can results in catastrophic failure. Referring to FIG. 7, an exhaust valve and water level indicator 75 are shown and disposed within the marine exhaust manifold 16 between the water injected exhaust elbow 65 and the water lift muffler 80 (FIG. 6). The valve/indicator 75 can include a float valve 105, such as a ball valve and a water level indicator 110 combined in a housing 116. The ball valve 105 translates along the housing 115 between ball valve guides 120*a*, 120*b* and is supported by ball valve supports 130*a*, 130*b* when the ball valve is disposed in an open position 135 (shown in phantom). When the ball valve 105 ascends upward to the closed position (as shown) the surface of the ball valve 105 contacts the housing 115 along valve sealing areas 140*a*, 140*b* thereby closing the valve. The rising water level within the housing 115 floats the water level indicator 110 upward to an alarm level which provides a signal 145 to warn an operator that the muffler 80 is overfilled.

A number of embodiments of the invention have been described. For example, the engine 12 as described above can be used for propulsion in marine applications. Nevertheless, it will be understood that various modifications may be made without departing from the spirit and scope of the invention. Accordingly, other embodiments are within the scope of the following claims.

What is claimed is:

1. A marine engine comprising:
   an exhaust system including
      a catalyst cooled by a flow of coolant, the catalyst arranged to intercept a flow of exhaust;
      a coolant injector that injects coolant into the flow of exhaust at a point downstream of the catalyst; and
      a sensor arranged to sense a characteristic of the flow of exhaust; and
   an engine controller configured to control an air/fuel ratio of the engine as a function of the sensed exhaust flow characteristic;
   wherein the engine controller is also configured to govern engine speed with respect to a constant speed while maintaining the air/fuel ratio.

2. The marine engine of claim 1, wherein the sensor is an oxygen sensor.

3. The marine engine of claim 2, wherein the sensor is a narrow-band oxygen sensor.

4. The marine engine of claim 1, further comprising a second sensor.

5. The marine engine of claim 4, wherein the second sensor is a carbon monoxide sensor.

6. The marine engine of claim 1, wherein the engine controller maintains the air/fuel ratio at a stoichiometric level.

7. The marine engine of claim 1, wherein the engine controller controls an electronic fuel injection system.

8. The marine engine of claim 1, wherein the catalyst is configured to simultaneously reduce oxides of nitrogen, carbon monoxide and hydrocarbons.

9. The marine engine of claim 1, wherein the catalyst is configured to reduce carbon monoxide to between about 9 parts per million and 30 parts per million.

10. The marine engine of claim 1, wherein the exhaust system further comprises a water-jacketed exhaust manifold.

11. The marine engine of claim 1, coupled to drive an electric generator.

12. A method of controlling emissions from an internal combustion engine configured for marine application, the method comprising:
   flowing a flow of coolant through an exhaust system of the engine to cool a catalyst positioned to intercept a flow of exhaust flowing along the exhaust system;
   injecting coolant into the flow of exhaust at a point downstream of the catalyst;
   sensing a characteristic of the flow of exhaust;
   controlling an air/fuel ratio of the engine as a function of the sensed exhaust flow characteristic; and
   governing engine speed with respect to a constant speed while maintaining the air/fuel ratio.

13. The method of claim 12 further comprising monitoring a second exhaust flow characteristic downstream of the catalyst and providing a warning to an operator when the second exhaust flow characteristic reaches a threshold level.

14. The method of claim 13, wherein the second exhaust flow characteristic is carbon monoxide level.

15. The method of claim 12, wherein the first exhaust flow characteristic is oxygen level.

16. The method of claim 12 further comprising controlling the air/fuel ratio with electronic fuel injection.

17. The method of claim 12 wherein the catalyst is configured to simultaneously reduce oxides of nitrogen, carbon monoxide and hydrocarbons.

18. The method of claim 12 wherein the catalyst is configured to reduce carbon monoxide to between about 9 parts per million and about 30 parts per million.

19. The method of claim 12 further comprising flowing coolant through a jacket about an exhaust manifold of the engine.

* * * * *

(12) EX PARTE REEXAMINATION CERTIFICATE (10241st)

United States Patent
Westerbeke

(10) Number: US 7,314,044 C1
(45) Certificate Issued: Aug. 5, 2014

(54) MARINE EMISSIONS CONTROL

(75) Inventor: John H. Westerbeke, Milton, MA (US)

(73) Assignee: WBIP, LLC, Taunton, MA (US)

Reexamination Request:
No. 90/013,089, Dec. 6, 2013

Reexamination Certificate for:
Patent No.: 7,314,044
Issued: Jan. 1, 2008
Appl. No.: 11/624,536
Filed: Jan. 18, 2007

Related U.S. Application Data

(63) Continuation of application No. 10/974,380, filed on Oct. 27, 2004, now Pat. No. 7,832,196.

(60) Provisional application No. 60/515,166, filed on Oct. 27, 2003.

(51) Int. Cl.
*F02D 41/00* (2006.01)
*F02D 41/02* (2006.01)

(52) U.S. Cl.
USPC ............ 123/672; 60/298; 60/274; 440/89 H; 440/89 B

(58) Field of Classification Search
None
See application file for complete search history.

(56) References Cited

To view the complete listing of prior art documents cited during the proceeding for Reexamination Control Number 90/013,089, please refer to the USPTO's public Patent Application Information Retrieval (PAIR) system under the Display References tab.

*Primary Examiner* — William Doerrler

(57) ABSTRACT

A marine engine has an exhaust system including a catalyst cooled by a flow of coolant, a coolant injector that injects coolant into the flow of exhaust at a point downstream of the catalyst, and a sensor arranged to sense a characteristic of the flow of exhaust, such as oxygen or carbon monoxide level. The engine controller is configured to control an air/fuel ratio of the engine as a function of the sensed exhaust flow characteristic.

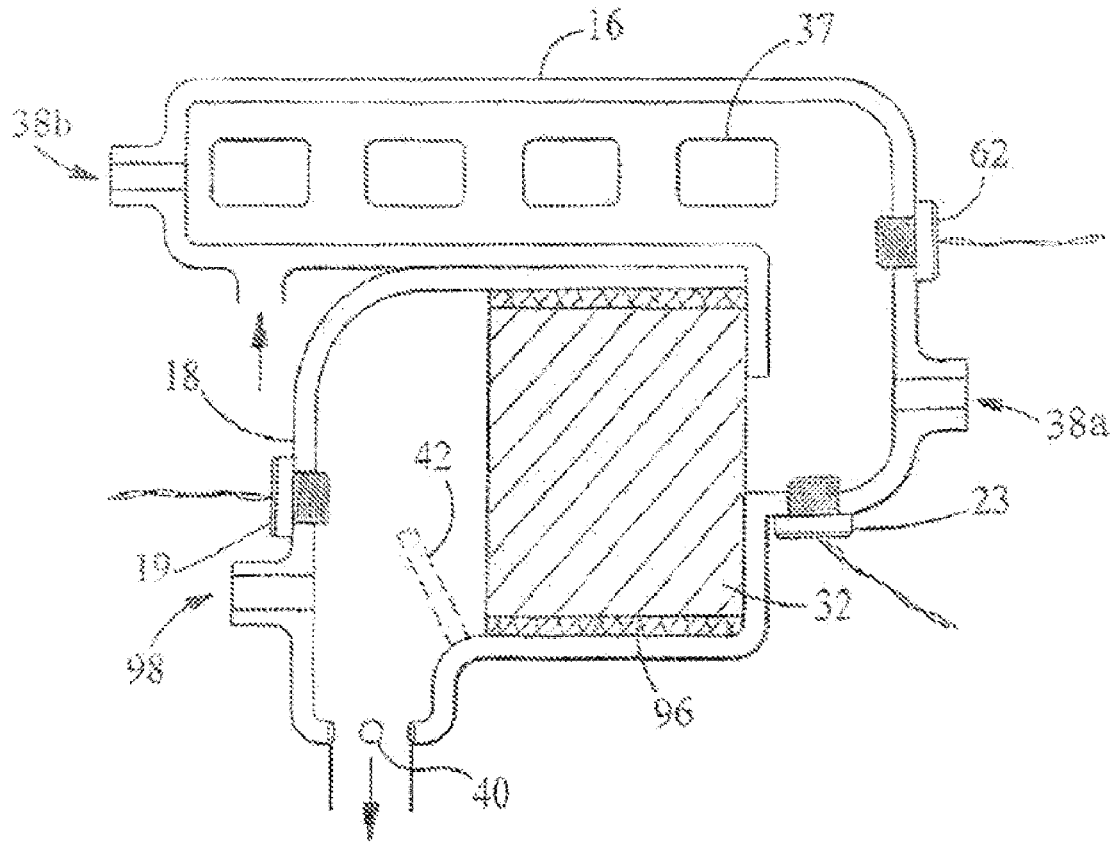

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-19 is confirmed.

\* \* \* \* \*